(12) United States Patent
Rollins et al.

(10) Patent No.: US 9,599,448 B2
(45) Date of Patent: Mar. 21, 2017

(54) APPARATUS AND METHODS FOR PROXIMITY SENSING CIRCUITRY

(75) Inventors: George E. Rollins, Chelmsford, MA (US); Weihua Chen, Westford, MA (US); Prachi S. Kulkarni, Burlington, MA (US); Diana A. Sufariu, Nashua, NY (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1522 days.

(21) Appl. No.: 11/947,563

(22) Filed: Nov. 29, 2007

(65) Prior Publication Data

US 2009/0140727 A1 Jun. 4, 2009

(51) Int. Cl.
*G01B 7/14* (2006.01)
*G01B 7/02* (2006.01)

(52) U.S. Cl.
CPC .............. *G01B 7/023* (2013.01); *G01B 7/14* (2013.01)

(58) Field of Classification Search
CPC ...... G01B 7/023; G01B 7/14; G01R 33/0023; G01R 33/0029
USPC .................................................. 324/207.16
See application file for complete search history.

(56) References Cited

U.S. PATENT DOCUMENTS

| | | | | |
|---|---|---|---|---|
| 3,497,808 A | * | 2/1970 | MacAdam et al. | 455/99 |
| 4,509,023 A | * | 4/1985 | Heimlicher | 331/176 |
| 4,879,512 A | * | 11/1989 | Leonard et al. | 324/207.16 |
| 4,893,076 A | * | 1/1990 | Leonard et al. | 324/207.17 |
| 4,942,372 A | * | 7/1990 | Heimlicher | 331/65 |
| 4,949,054 A | * | 8/1990 | Briefer | 331/117 R |
| 5,043,679 A | * | 8/1991 | Kriz et al. | 331/65 |
| 5,332,966 A | * | 7/1994 | Berberich | 324/207.12 |
| 6,236,200 B1 | * | 5/2001 | Nekado et al. | 324/207.26 |
| 6,487,452 B2 | * | 11/2002 | Legay | 607/32 |
| 6,600,380 B1 | * | 7/2003 | Guggenbuhl et al. | 331/117 R |
| 6,650,111 B2 | * | 11/2003 | Christensen | 324/207.26 |
| 7,902,818 B2 | * | 3/2011 | Bernard et al. | 324/207.26 |
| 2004/0189290 A1 | * | 9/2004 | Lehman et al. | 324/230 |
| 2007/0279002 A1 | * | 12/2007 | Partovi | 320/115 |
| 2008/0084203 A1 | * | 4/2008 | Meyer | 324/207.15 |

* cited by examiner

*Primary Examiner* — David M. Schindler
(74) *Attorney, Agent, or Firm* — Amin, Turocy & Watson, LLP

(57) ABSTRACT

An inductive proximity sensor is disclosed. The proximity sensor includes a source circuit with an inductive element configured to deliver energy to a resonator when a source current is changed. In various embodiments, the source current is provided a step current source. In various embodiments, the source current is provided by constant current source coupled to the inductive element by a switch. Apparatus and methods for operating the inductive proximity sensor are disclosed.

19 Claims, 5 Drawing Sheets

US 9,599,448 B2

APPARATUS AND METHODS FOR PROXIMITY SENSING CIRCUITRY

TECHNICAL FIELD

The various embodiments described herein relate generally to sensors, including inductive proximity sensors.

BACKGROUND

An automated system can enable product manufacturing at greater speeds, lower cost and with a higher safety margin than is generally possible with a manually operated system. Many automated systems employ sensors to guide the movement of the various interworking parts that make up the system. Since the desire to lower product manufacturing costs will likely continue to grow, so will the use of automated systems. Therefore, the number of sensors can be expected to increase.

BRIEF SUMMARY OF THE EMBODIMENTS

In an embodiment, an inductive sensing circuit includes a source circuit for energizing an inductive proximity sensor. The source circuit includes a current source, a switching device coupled to the current source, and an inductive element coupled to the switch. The inductive sensing circuit also includes a resonant circuit coupled to the inductive element.

In an embodiment, a proximity detector includes a current loop having a current source and an inductive circuit. The proximity detector also includes a control for initiating a change in a current flowing in the inductive circuit with the control being located in the current loop. The proximity detector also includes an inductive proximity sensor coupled to the inductive circuit. The inductive proximity sensor includes a resonator circuit having a bifurcated inductance. The inductive proximity sensor is configured such that the current flowing in the inductive circuit and a voltage across the resonator circuit are initially unchanged upon activating the control.

In an embodiment, a method of powering an inductive proximity sensor includes applying a source current to an inductive circuit until a first current in the inductive circuit obtains at least a steady state condition. The method includes changing an amplitude of the source current at a first time and monitoring a second current flowing from the inductive circuit to a resonant circuit having a bifurcated inductance. The second current is less than or equal to the source current. The method also includes re-establishing the first current at a second time if an amplitude of the second current is less than a specified value, and imposing a blanking time interval while re-establishing the first current.

In an embodiment, a process control system includes a source current circuit containing a current source and an inductive circuit. The system also includes a control for initiating a change in a current flowing in the inductive circuit. The control is located in the source current circuit. The system also includes an inductive proximity sensor coupled to the inductive circuit. The inductive proximity sensor includes a resonator circuit having a bifurcated inductance. The inductive proximity sensor is configured such that the current flowing in the inductive circuit and a voltage across the resonator circuit are initially unchanged upon activating the control. The system further includes a processor coupled to at least one of the source circuit and the inductive proximity sensor. The processor is configured to process signals associated with eddy currents generated in a metal.

DETAILED DESCRIPTION

Figure 1:
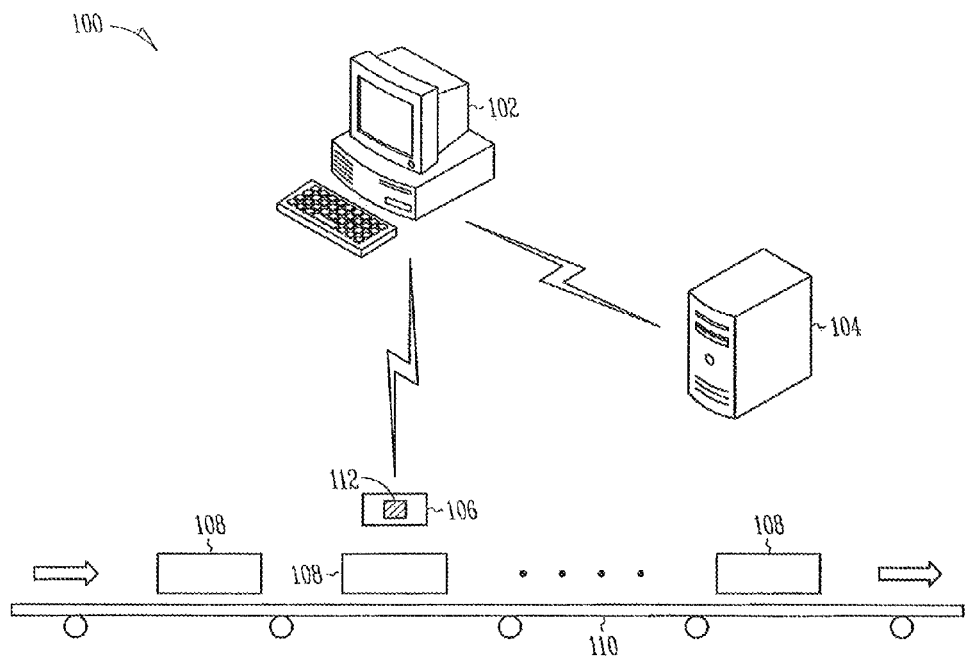
FIG. 1 illustrates a system according to various embodiments of the invention.

The following detailed description refers to the accompanying drawings that show, by way of illustration, specific details and embodiments in which the invention may be practiced. These embodiments, which are also referred to herein as "examples," are described in sufficient detail to enable those skilled in the art to practice the invention.

The type of sensor used in and by an automated system generally depends on the intended operation. Systems that manufacture, manipulate or otherwise operate on components that include metal can often use an inductive sensor. Systems that control movement of metal components and surfaces used in automotive, watercraft and aircraft flight can also use an inductive sensor. Welding apparatus, robots for detection and removal of explosive mines, valve position sensors, gear rotation and position sensors, and security systems, for example, can also use inductive sensors since the target of interest contains metal, which can support moving electrical charge generated by coupling a magnetic field.

Inductive proximity sensing is based on a change in the quality factor or a time constant of a decaying electromagnetic field of an inductive element. An inductive sensor can operate using a Wheatstone bridge circuit to measure an impedance imbalance between circuit branches. One branch of the bridge circuit includes an inductive sensing coil and another branch includes an inductive reference coil sufficiently decoupled or shielded from a target of interest. An alternating current is generated in each coil. The impedance of the sensing coil is a function of the magnetic field coupling to the target metal, while the impedance of the reference coil is independent of the target metal. The difference in the impedances of the sensing coil and the reference coil can be used to estimate proximity of the sensor to the target. A drawback to the Wheatstone bridge is that only a portion of the target sensing and reference inductive signals are utilized, which can cause a less accurate measurement of a target in proximity to the sensor.

A bifurcated inductive circuit can fully and directly measure the reference and sensing inductive signals used for determining the proximity to a metal-containing target. Each inductive portion is coupled to a capacitive portion to provide a resonant electromagnetic field. The resonant electromagnetic field of each inductive portion is generated by a current flowing though each portion. The inductive reference portion and inductive sensing portions are oriented in orthogonal directions separated by distance. The sensing portion is located closest to the target with an orientation that allows for the greatest coupling of energy to the target of interest. The reference portion is located furthest from the target of interest with an orientation that minimizes coupling of energy between it and the target. The inductive reference and inductive sensing portions can be formed to a planar circuit arrangement. In various embodiments, the reference portion is shielded from the target with Mu-metal to reduce coupling of electromagnetic energy between it and the target. As the inductive circuit is moved closer to the target with metal, an increasingly greater portion of the resonant electromagnetic field originating from the inductive sensing portion will couple to the metal in the target. Eddy currents will then be generated with an increasing magnitude in the metal drawing increasing amounts of energy from the sensing portion, thereby reducing the strength of the resonant oscillations in the sensing portion without appreciably affecting the strength of the resonant oscillations in the reference portion of the inductive circuit.

The magnitude of the eddy currents flowing in the metal also varies with metal composition as does the values of mutual inductance. Variations in mutual inductance can cause variations in the phase of the resonant oscillations of the sensing portion. This in turn manifests as a phase shift in the resonant oscillation between inductive reference and inductive sensing portions. Phase and amplitude information can be extracted from the corresponding oscillating electromagnetic field waveform for use in determining the type of metal contained in the target and sensor proximity to the target.

The resonant portion of the inductive proximity sensor is energized before energy oscillations are initiated. The resonant portion can receive energy from an isolated capacitor pre-charged to specified D.C. voltage. Here, the resonant portion generates electromagnetic energy oscillations immediately after being switch connected to the pre-charged capacitor. With this configuration, the intrinsic resistance of the switch can degrade the quality factor of the resonant portion of the inductive sensor thereby causing a parasitic reduction in energy oscillations. Since inductive proximity sensing is based on a change in the quality factor or a time constant, removing the switch from the path of the resonant circuit is desirable.

The oscillation circuit of an inductive proximity sensor can also be powered by a constant current source coupled in series with an inductive circuit that is not used for generating the sensing field. The inductive circuit is coupled directly to the resonant portion of the inductive sensor. A switch can be located either internal to the constant current source or between the inductive circuit and the constant current source. The inductive circuit is energized with a steady state current. Opening the switch initiates an energy transfer from the inductive circuit to the resonant portion thereby generating the energy oscillations necessary to form eddy currents in a metal-containing target. Because the switch is not located within the path of the resonant circuit, the resistance of the switch cannot contribute a parasitic change in quality factor or time constant. In some embodiments, a step current source is substituted for the constant current source thereby rendering the switch coupling the current source to the inductive circuit optional.

FIG. 1 illustrates a system according to various embodiments of the invention. In this example, system 100 includes computer 102 communicatively coupled to server 104 and tool 106. Tool 106 includes a proximity sensor 112 to sense the distance between a tool surface and target objects 108 on moving platform 110. Sensor 112 can also be used to control the position and motion of target objects 108 and tool 106 in essentially real time. Accordingly, sensor 106 may form a portion of, or be attached to, automated apparatus, such as a robot used for welding. Such apparatus can also be communicatively coupled to server 104 and computer 102 to enable adjustment of the distance between tool 106 and objects 108. Server 104 can be used as a platform for storing instructions for operating tool 106 and platform 110 as well as for storing data acquired with sensor 112. Computer 102 or another computer coupled to server 104 control operation of platform 110.

It will be appreciated that the above illustrates one possible arrangement and is not intended to limit use of the proximity sensor 112 to the particular configuration shown. For example, each target object 108 can be of a different size and shape. Further, the size of proximity sensor 112 can be smaller or larger than a target object or a tool. The shape of the proximity sensor 112 can also be formed to the shape of a target object. The proximity sensor 112 can also represent a plurality of proximity sensors. In various embodiments, proximity sensor 112 is an inductive sensor configured to sense proximity to a metal-containing object, as described below.

Figure 2:
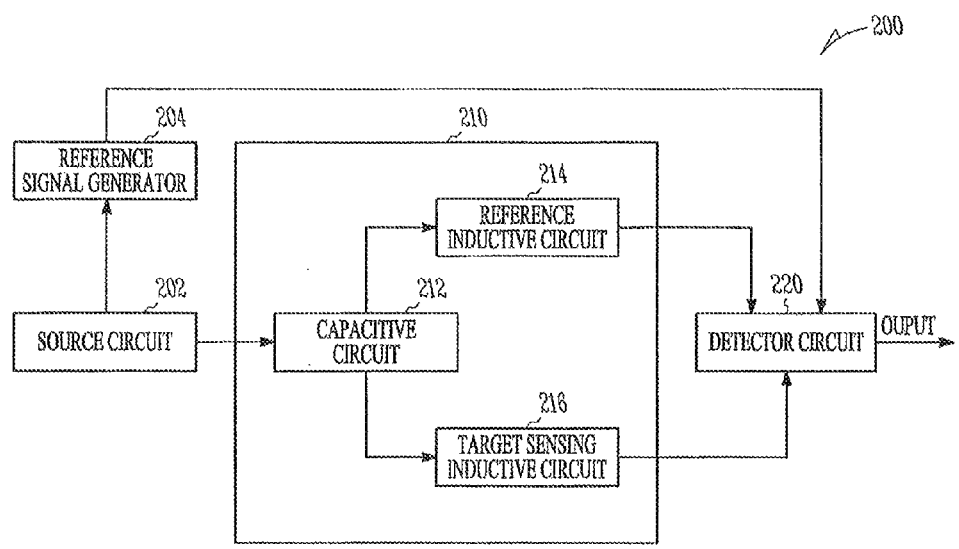
FIG. 2 is a block diagram illustrating an inductive proximity sensor according to various embodiments of the invention.

FIG. 2 is a block diagram illustrating an inductive proximity sensor according to various embodiments of the invention. In this example, system 200 includes a source circuit 202 coupled to a reference signal generator 204 and to a resonator 210 that is further coupled to detector circuit 220. The resonator 210 includes a capacitive circuit 212 coupled to reference inductive circuit 214 and to target sensing inductive circuit 216. Capacitive circuit 212 and inductive circuits 214 and 216 form two resonator circuits capable of being simultaneously energized by source circuit 202. The resonant frequencies of each inductive circuit in an unperturbed state are identical.

Capacitive circuit 212 can include a network of capacitive elements. Inductive circuits 214 and 216 can include a network of inductive elements. The capacitors and the inductors can be variable to allow for adjustment in oscillation frequency. Both capacitors and inductors can include one or more respective passive and active components in combination. For example, inductors can be formed from one or more vertically stacked spiral conductors on a planar circuit, conductive wire coils, and conductive wire loops. Capacitors can be formed from any number of parallel plate geometries and diode junction devices. Capacitive circuit 212 and inductive circuits 214 and 216 can also be configured to form a damped resonator by incorporating one or more attenuation elements in a series or parallel arrangement.

Reference signal generator 204 is coupled to source circuit 202 to monitor the amplitude of the current flowing to the resonator 210 in essentially real time. Reference signal generator 204 can be configured to transmit a voltage signals to detector circuit 220 that is representative of a time dependent current being monitored.

Detector circuit 220 receives resonant energy directly from each inductive circuit 214, 216, and reference signals from signal generator 204 to generate an output signal containing phase and amplitude information. The corresponding phase and amplitude information allows for the discrimination of the composition of the target metal and the distance between sensor 200 and a target metal of interest to be determined.

The accuracy of the phase and amplitude information, and hence, the accuracy with which proximity sensor 200 can sense proximity to a target object of interest is determined, in part, by the characteristics of source circuit 202. Of concern are resonant oscillation strength and source switching transients.

In various embodiments, source circuit 202 includes a constant current source coupled in series with an inductive circuit. The inductive circuit is coupled directly to resonator 210 at capacitive circuit 212. A switching circuit can be located in source circuit 202 to initiate the oscillations in the resonant circuit that are required to induce eddy currents the metal of a target object. The switching circuit can be located between inductive circuit and the constant current source, or it can be located in the current source itself. In either case, since the switching circuit is not located in the resonant path, an associated parasitic switching resistance cannot degrade the quality factor of the resonator. Consequently, the oscillations of a resonator can be made of a longer time duration allowing a more accurate measurement of time constant. Longer oscillation time may also provide for a greater resolution of a phase shift due to metal composition.

In various embodiments, the current source used in source circuit 202 is a step current source for enabling changes in the application of excitation energy to the resonant circuit 210. In various embodiments, the source circuit is coupled to a processor, such as a microprocessor to control its operation.

Figure 3:
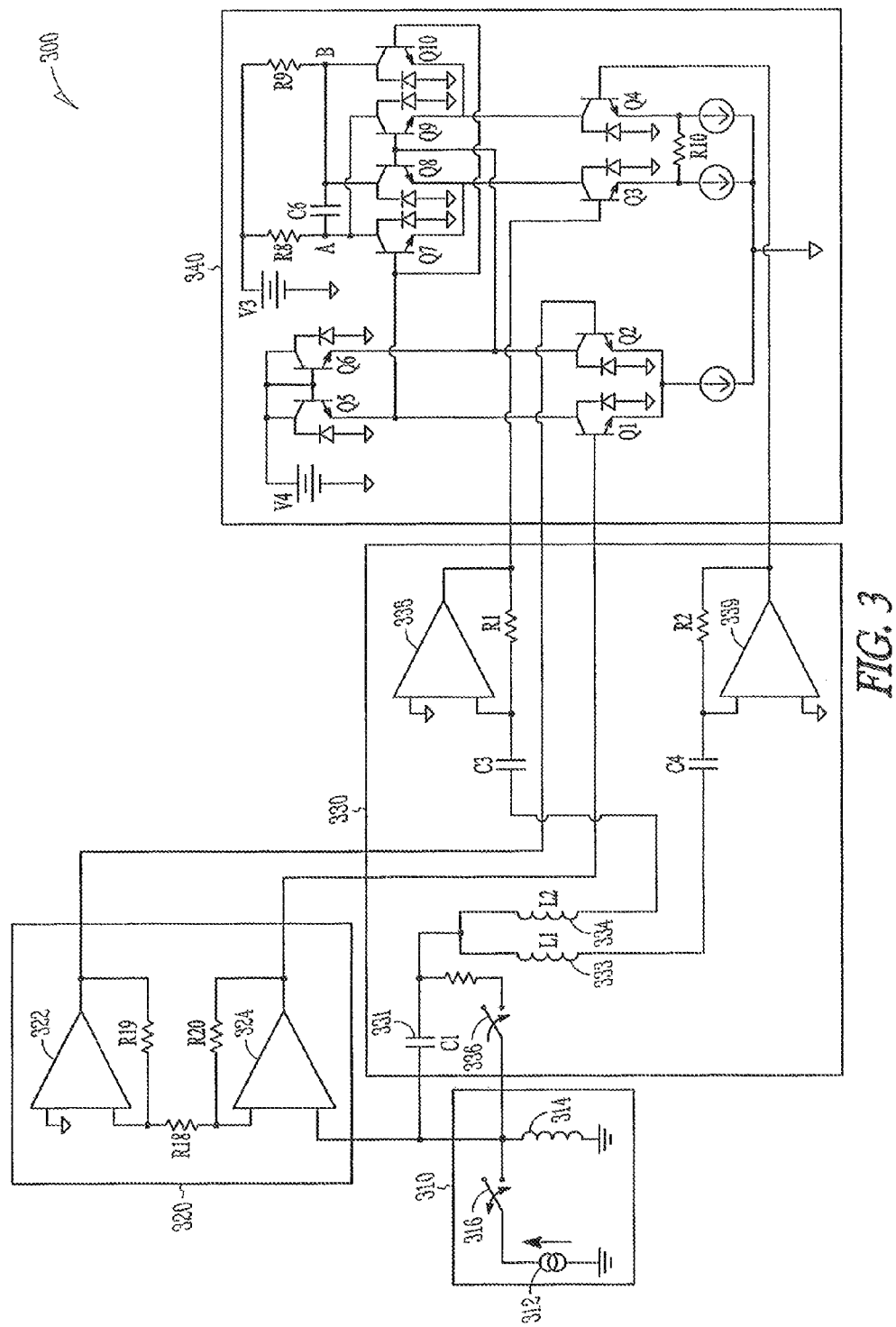
FIG. 3 is a schematic illustrating an inductive proximity sensor according to various embodiments of the invention.

FIG. 3 is a schematic illustrating an inductive proximity sensor according to various embodiments of the invention. Proximity sensor 300 includes source circuit 310 coupled to a differential input voltage amplification circuit 320 and to resonant circuit 330. An analog multiplier 340 is coupled to resonant circuit 330 to receive signals associated with reference inductor 334 and target sensing inductor 333.

Source circuit 310 includes a constant current source 312 coupled in series with an inductive element 314 by a switch 316. For many applications, a source current ranging in magnitude from about 0.5 mA to about 20 mA can provide sufficient energy for operating resonant circuit 330 as a proximity sensor. The value of the inductance provided by inductive element 314 can be adjusted to store a specified amount of energy based on the value of the current flowing in the source circuit.

Switch 316 initiates the flow of current, and hence the transfer of energy, to resonant circuit 330 upon opening. Switch 316 can be any device suitable capable of isolating constant current source 312 from inductive element 314. Examples of switches include mechanical, electromechanical, shielded magnetic, and semiconductor junction devices. In some embodiments, switch 316 is a device located internal to current source 312. Where current source 312 is a step adjustable current source, switch 316 is optional.

Resonant circuit 330 includes capacitor 331 coupled in series with a bifurcated inductive circuit that includes reference inductor 334, target sensing inductor 333, and transimpedance amplifiers 338 and 339. In various embodiments, transimpedance amplifiers 339 and 338 are high impedance operational amplifiers. Capacitor 331 and inductors 314, 333, 334 establish a resonant electromagnetic field oscillating at a specified center frequency after receiving energy from source circuit 310. In various embodiments, reference inductor 334 and target sensing inductor 333 have the same value of inductance so that each resonates with essentially the same current amplitude.

The output of reference inductor 334 and target sensing inductor 333 are coupled to transimpedance amplifiers 339 and 338, respectively. The capacitors C3 and C4 provide DC decoupling of the resonant energy oscillations. As illustrated, transimpedance amplifiers 338 and 339 are each configured to have an equivalent zero ohm input impedance. Thus, transimpedance amplifiers 339 and 338 enable direct sensing of the currents flowing through reference inductor 334 and target sensing inductor 333, respectively An output signal for each transimpedance amplifier is coupled to an input of analog multiplier 340 to generate a differential signal representative of the current signals in the reference inductor 334 and target sensing inductor 333 expressed as a voltage.

The source circuit 310 is also coupled to a differential input voltage amplification circuit 320 at a circuit node where it is also coupled to resonant circuit 330. Amplification circuit 320 includes high impedance amplifiers 322 and 324 coupled across resistor R18, each in a negative feedback topology thereby creating a differential voltage input. In various embodiments, amplifiers 322 and 324 are high impedance operational amplifiers. Amplification circuit 320 provides high impedance points for a transmitting voltage signals corresponding to the resonant signal generated by resonant circuit 330 to the inputs of an analog multiplier 340, without substantially attenuating the current circulating in the resonant circuit. An output signal of each amplifier 322, 324 is transmitted to an input of analog multiplier 340 for use in synchronizing the detection of signals provided by the reference inductors 334 and target sensing inductors 333.

Analog multiplier 340 is a synchronous detector with Q1-Q10 arranged as differential pairs in a cascode emitter follower topology. The output of analog multiplier 340, across C6 at nodes A and B, is a signal related in amplitude to the difference between the current in the reference inductor 334 and the current in target sensing inductor 333. Capacitor C6 forms a portion of a low pass filter for removing high frequency component from transmitted in the output signal. The resultant output measured between nodes A-B is a decaying DC voltage representative of difference in amplitude of the resonant current oscillations of the reference inductor 334 and target sensing inductor 333. As illustrated, analog multiplier 340 can be configured as a synchronous detector, or as a quadrature detector to generate phase and amplitude information related to the resonant oscillations of circuit 330. Analog multiplier 340 can also be coupled to additional circuitry, such as an analog-to-digital converter, for further processing.

In various embodiments, the operation of proximity sensor 300 is as follows. When switch 316 is closed, current source 312 establishes a constant current flowing in a loop through inductive element 314. In steady state, the voltage across inductive element 314 is determined as a product of the intrinsic resistance of inductive element 314 and the amplitude of the constant current supplied by source 312. In steady state, the current flowing through inductive element 314 is the same as the current flowing from current source 312. In an embodiment, the steady state voltage across inductive element 314 is zero. When switch 316 is open sometime after steady state conditions exist, the current flowing in inductive element 314 is initially unchanged. The voltage across capacitor 331 does not instantaneously change, nor can the current through either reference inductor 334 or sensing inductor 333. Therefore, the initial energy transferred from the inductive element 314 to resonant circuit 330 is zero. The corresponding output signals from transimpedance amplifiers 338 and 339 are also zero as is the output of differential input voltage amplification circuit 320. Regardless of the state of switch 316, the instantaneous resonant energy upon opening and closing the switch is unchanged due to the current flowing in inductive element 314. The same is true where current source 312 is a step current source, with or without switch 316. Thus, source circuit 310 provides a means for controlling energy transfer to a resonant circuit with a low switching transient. The reduction in switching transients reduces the number of off-resonance frequency components generated, as does the use of a constant current source since such a current source has no associated frequency components.

At some point after switch 316 is open, the energy in the resonant circuit 330 can be sufficiently low as to require reenergizing to continue sensing operation. Prior to initiating the next period of oscillation it can be desirable to remove any remaining energy in the resonant circuit. In various embodiments, the remaining energy in resonant circuit 330 is removed upon reaching a specified minimum threshold condition. A shunt resistor 335 having a low resistance can be coupled between the target sensing inductor 333 and reference inductor 334 and capacitor 331 as a means for dissipating energy in the resonant circuit 330. For example, after switch 316 is opened and the amplitude of the oscillations decrease to a specified value during operation, switch 336 can be closed coupling shunt resistor 335 to inductor 314 and de-energizing resonant circuit 330. After de-energization of the resonant circuit 330 is complete, switch 336 can be opened and switch 316 can be closed to initiate charging of inductive element 314.

In various embodiments, a timing module is used to provide a blanking interval during the times inductive element 314 is being reenergized. The blanking interval can be of a duration beginning at a threshold amplitude sensed by differential input voltage amplification circuit 320 triggering a change in the source current provided to inductive element 314, such as closing switch 316 or step adjusting the source current. The blanking interval can end at or after steady state conditions are obtained for inductive element 314, as sensed by amplification circuit 320.

In various embodiments, a gating interval can be imposed using the timing module establishing a time period in which proximity is sensed. The gating time interval can be of a duration beginning at a time when switch 316 is first opened, or when steady state conditions are obtained for inductive element 314, and end at a time when the oscillations in the target sensing inductor 333 or reference inductor 334 obtain a specified minimum threshold condition. The gating interval can be used to trigger closing of switch 336 to quench the oscillations in the resonant circuit 330 prior to the reenergizing of inductive element 314.

The timing module described above can be a timing circuit coupled to proximity sensor 300 or a software module located in a processor memory coupled to proximity sensor 300.

After current begins to flow from the inductive element 314 to resonant circuit 330, oscillations are initiated with the resonant energy oscillation occurring between capacitor 331, inductor 314, reference inductor 334 and target sensing inductor 333. The resonant frequency of oscillation is determined by the product of the capacitor 331 and inductors 314, 333, and 335, as is known to one of ordinary skill in the art. As proximity sensor 300 nears a target containing metal, the electromagnetic field associated target sensing inductor 333 couples to the target metal. Eddy currents form in the target metal that draw energy from the target sensing inductor 333 at a rate dependant on its distance to the target and the type of metal contained in the target. The reference inductor, however, being shield and oriented relative to the field generated in the target metal, as described above, provides resonant oscillations with an amplitude that is substantially unchanged by the eddy currents. Consequently, the rate of decay in the energy oscillations for the target sensing inductor 333 increases relative to reference inductor 334. A degree of mutual inductance is also established between the target metal and sensing inductor 333 that varies with the type of metal, for example aluminum versus iron. The strength of the mutual inductance can induce a phase shift in the oscillations of the target sensing inductor 333 that is not present in the reference inductor 334. The extent of the phase shift can therefore be used to identify the particular type of metal. Analog multiplier 340 can be configured to provide output signal corresponding to amplitude and phase, as describe above. Thus, inductive proximity sensor 300 can also be used to identify and select target materials.

Cracks formed in the metal, for example, through metal fatigue can be detected using proximity sensor 300. Cracks in the target metal can cause additional losses in the eddy currents generated. Cracks may appear as a variation in the decay time constant for the resonant oscillations of the target sensing inductor 333. Using FIG. 1 as an example, for a fixed sensor-target distance, the rate of decay in the amplitude of the oscillation of the sensing inductor can change at the point where target 108 moving under sensor 112 contains a metal crack.

Figure 4:
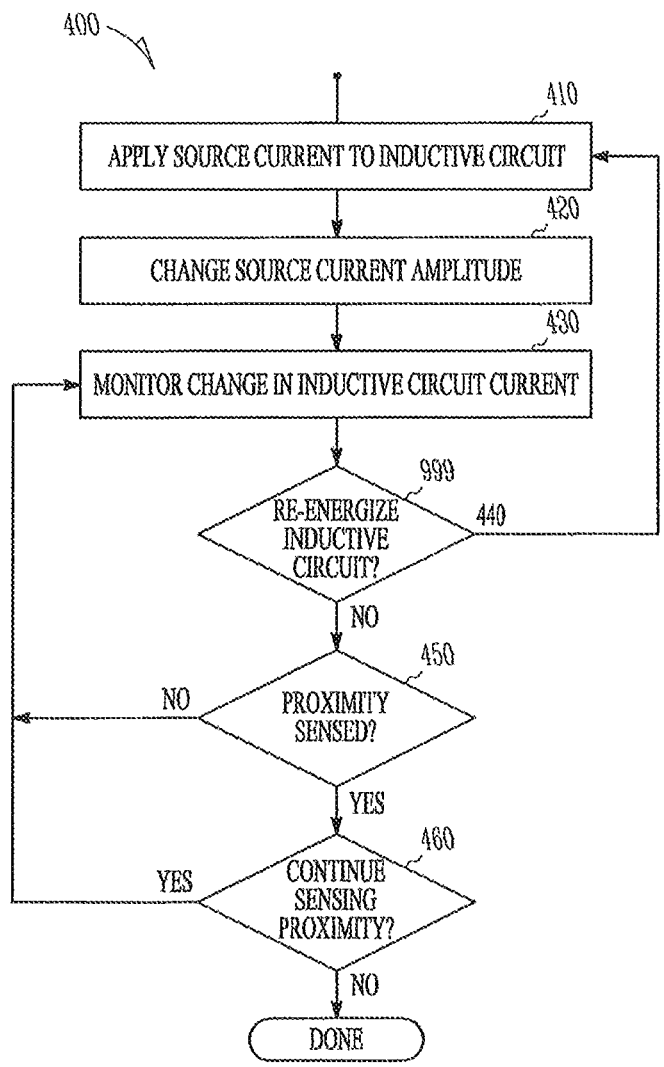
FIG. 4 illustrates a method of energizing an inductive proximity sensor according to various embodiments of the invention.

FIG. 4 illustrates a method of energizing an inductive proximity sensor according to various embodiments of the invention. Method 400 begins at block 410 by application of a source current to an inductive circuit through a switching device, as illustrated and described above. The inductive circuit is coupled to a resonant circuit and a current monitoring circuit, such as illustrated in FIGS. 2 and 3. In some embodiments, the inductive circuit is coupled in series with a constant current source until the source current flowing in the inductive circuit is time invariant. In various embodiments, a step current source is placed in series with the inductive circuit with a current control circuit located internal to the step current source. Where the control circuit is located in the current source, a separate switching device is optional.

At block 420, the amplitude of the source current is changed by either opening the switching device located between the inductive circuit or by adjusting the current using the current control device located in the current source. Where a current control device is used in connection with a step current source, the current amplitude can be adjusted between two non-zero levels as well as between zero and some positive or negative value. For example, between 5 mA to 10 mA, −5 mA to −10 mA, and 0 to +/−10 mA.

At block 430, the amplitude of the current passing from the inductive circuit located in the source circuit to a resonant circuit is continuously monitored. In various embodiments, the current is converted to differential voltage signals using a circuit, such as differential input voltage amplification circuit 320.

At block 440, the amplitude of the current is continuously monitored and assessed for energy remaining in the inductive circuit. If the amplitude is less than a specified value indicating there is insufficient energy to sustain oscillations in the resonant circuit for a particular application, the source current is reapplied to the inductive circuit to re-energize it. This can be accomplished by either closing the switching device between the constant current source and the inductive circuit until a time invariant current exists in the inductive circuit, or adjusting the current control circuit to provide a specified current through the inductive circuit. A blanking time interval can instituted during the time the inductive circuit is being re-energized so that switching transients introduced into the resonant circuit are not observable by a resonant oscillation detector, such as analog multiplier 340. If there is sufficient energy remaining in the inductive circuit, then proximity sensing proceeds.

At block 450, a circuit such as analog multiplier 340 is used to acquire data used for determining sensor proximity to a target metal. If target proximity is not sensed, then the amplitude of the current flowing from the inductive current continues to be monitored while the resonator operates. In some embodiments, the amplitude of the resonant oscillations is monitored at the circuit node where the inductive circuit couples to the resonant circuit. If a measurement of proximity is obtained, then operation proceeds to block 460.

At block 460, the option is provided to continue sensing proximity to the target metal. This can occur, for example, where the target is in motion, where the apparatus controlling target position is in motion, or both. Method 400 continues until such time as knowledge of target proximity is no longer desired.

Figure 5:
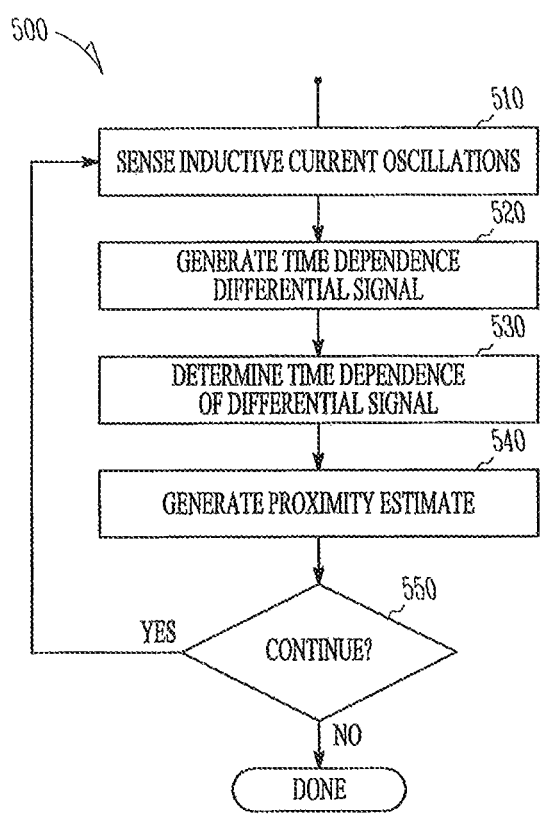
FIG. 5 illustrates a method of operating an inductive proximity sensor according to various embodiments of the invention.

FIG. 5 illustrates a method of operating an inductive proximity sensor according to various embodiments of the invention. The method begins at block 510 where the current oscillations in a reference inductive circuit and a target sensing inductive circuit are sensed. In various embodiments, the reference inductive circuit and the target sensing inductive circuit is a bifurcated inductive circuit coupled to a capacitive circuit to form a resonant circuit. The output of each inductive circuit of the resonator is coupled to different transimpedance amplifier having a zero ohm input impedance. The output of each transimpedance amplifier is a voltage representative of the current oscillations occurring in either the reference or target sensing inductive circuit.

At block 520, the signals generated from the reference and target sensing inductive circuits are combined with signals representative of a source inductive current flowing into the resonator. The signals representative of a source inductive current can be used to synchronize detection of the signals generated from the reference and target sensing inductive circuits. The current oscillation are generated in each of the reference and target sensing inductive circuits with the same resonant frequency, and therefore, can be combined to constructively add or cancel, depending on the type of circuitry used. A synchronous detector, such as detector 340 can be configured to receive signals from the transimpedance amplifiers coupled to the reference and target sensing inductive circuits. The analog multiplier generates an output signal corresponding to the difference between time varying amplitudes of the currents flowing through the bifurcated portions of the resonant circuit. In various embodiments, a quadrature detector is substituted for the synchronous detector.

At block 530, the amplitude output of the analog multiplier is analyzed to determine a time constant associated with the differential signal. The value of the time constant is a measure of the rate of decay of the current in the target sensing inductive circuit. For example, because the reference inductive circuit is oriented and/or shielded from the target metal, only the current flowing in the target sensing inductive circuit contributes to the formation of eddy currents in the target metal. Number and magnitude of the eddy currents forming in the metal depends of the field strength of the oscillations coupling to the metal. Field strength increases with decreasing distance between the target and target sensing inductive circuit. The eddy currents generated cause the rate of decay in the current flowing in the target sensing inductive circuit to increase over that of the current in flowing in the reference inductive circuit. This difference can be detected using the circuit described above and illustrated in FIGS. 2 and 3. In various embodiments, the target metal composition induces a phase shift in the current signal associated with the target sensing inductive circuit.

At block 540, the time constant derived from the amplitude of the differential signal at the output of the analog multiplier is used to estimate distance between the inductive proximity sensor and the target metal. The time constant can be compared to a database of time constants correlated with distance and metal, or a processor can be used to interpret change in time constant to provide an estimate of proximity using an algorithm. The phase of the differential signal at the output of the analog multiplier can be shifted to provide a measure of discrimination between target metals. The phase shift can also be used to identify the target metal. Here, a processor can be used to correlate the observed phase change with known phase changes stored in a database. A processor can also be used to interpret phase changes in essentially real time using an algorithm. Such correlations can also be performed at any time after obtaining the phase of the differential signal.

At block 550, the option is provided to continue sensing proximity. The desire to continue sensing may exist where the target is in motion, where the apparatus controlling target position is in motion, or both. Method 500 can continue until such time as knowledge of target proximity is no longer desired.

Figure 6A:
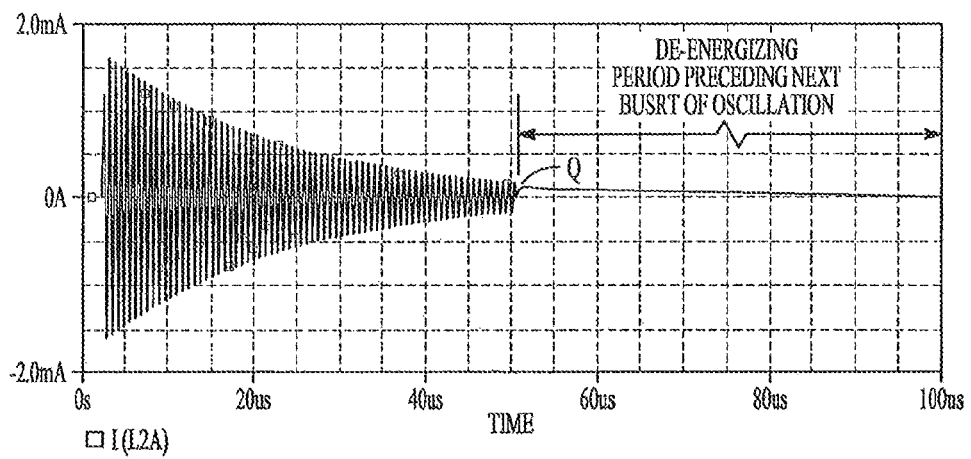
FIGS. 6A-6C illustrate simulated operation of a proximity sensor according to various embodiments of the invention.
Figure 6B:
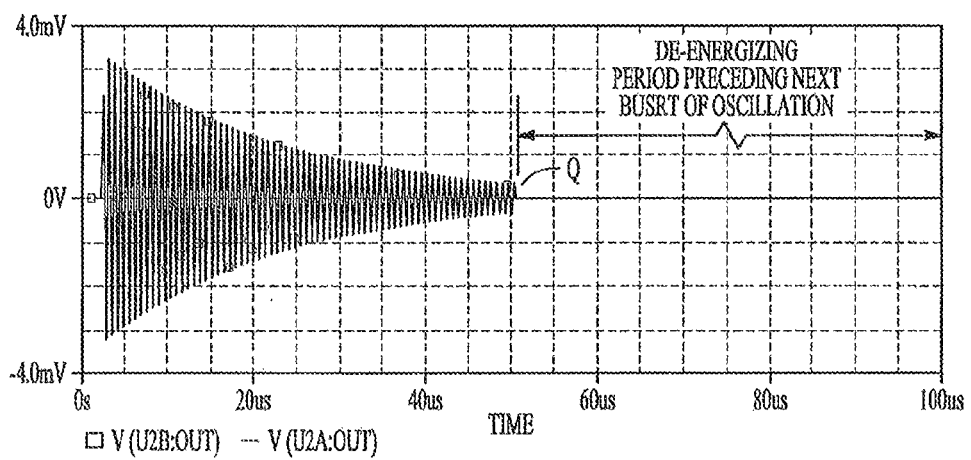
Figure 6C:
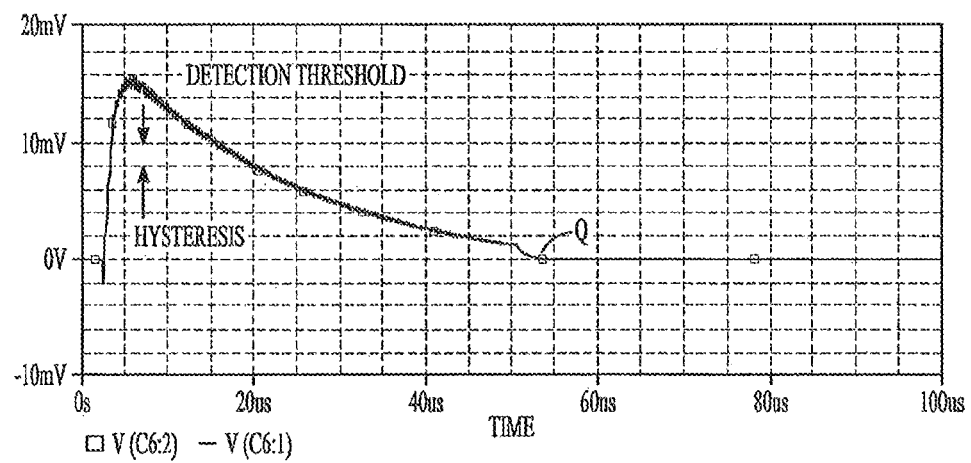

FIGS. 6A-6C illustrate simulated operation of a proximity sensor, such as proximity sensor 300 according to various embodiments of the invention. FIG. 6A shows simulated current oscillations in the reference inductor 334 as a function of time after switch 316 is opened. FIG. 6B shows the simulated difference in the voltage signals output from transimpedance amplifiers 338 and 339 as a function of time in relation to the current oscillations in the reference inductor 334. FIG. 6C shows the simulated output voltage signal measured across capacitor C6 at nodes A-B of analog multiplier 340 as a function of time in relation to the oscillation waveforms of FIGS. 6A-B. At point Q in FIGS. 6A-C, switch 336 is closed illustrating de-energization of resonant circuit 330 through shunt resistor 335 prior to recharging inductive element 314, as described above.

Inductive proximity sensors can be used in automotive and aircraft manufacturing as well as in the general operation of industrial control systems. Because inductive sensors can be made at low cost, they can also be placed in control loops and used in the operation of automobile motors and transmissions and the control surfaces of an aircraft. An inductive sensor can be formed with a resonator. The accuracy of such an inductive proximity sensor can be limited by the number of off-resonance frequency components generated by its energizing source. In general, introducing the fewest possible number off-resonance frequency components into the resonator during sensing operation is desirable. It is also desirable to maximizing the target sensing signal when measuring proximity. A reduction in the parasitic switching resistance in the path of the resonator can increase the availability of the signal using for sensing target proximity. Therefore, mechanisms that minimize the off-resonance frequency components generated by the energy source powering the sensor, and maximize the resonant oscillation time are important. The subject matter disclosed herein provides methods, devices and apparatus for generating stable oscillations with minimum frequency spread while also eliminating parasitic switching resistance in the resonant portion of the inductive sensor as determined by the inventors. The subject matter disclosed also provides methods, devices and apparatus for generating a strong target sensing signal.

The above Detailed Description is intended to be illustrative, and not restrictive. The various embodiments are not necessarily mutually exclusive, as some embodiments can be combined with one or more other embodiments to form new embodiments. For example, the above-described embodiments (and/or aspects thereof) embodiments may be combined, utilized and derived therefrom, such that structural and logical substitutions and changes may be made without departing from the scope of this disclosure. Such embodiments of the inventive subject matter may be referred to herein, individually and/or collectively, by the term "invention" merely for convenience and without intending to voluntarily limit the scope of this application to any single invention or inventive concept if more than one is in fact disclosed. Many other embodiments will be apparent to those of skill in the art upon reviewing the above description. The scope of the invention should, therefore, be determined with reference to the appended claims, along with the full scope of equivalents to which such claims are entitled.

The methods described herein do not have to be executed in the order described, or in any particular order, unless it is otherwise specified that a particular order is required. Moreover, unless otherwise specified, various activities described with respect to the methods identified herein can be executed in repetitive, simultaneous, serial, or parallel fashion.

The terms "a" or "an" are used, as is common in patent documents, to include one or more than one. The term "or" is used to refer to a nonexclusive or, unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring the abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment with each embodiment being combinable with each other embodiment.

What is claimed is:

1. An inductive proximity sensor comprising:
a source circuit containing only a current source, a switch, and an inductive source element, wherein the source circuit is a circuit loop containing only the switch which is coupled to the current source and the inductive source element which is coupled to the switch at a connection point, and wherein the switch is configured to operatively couple the current source to the inductive source element in a first state and to operatively isolate the current source from the inductive source element in a second state; and
a resonant circuit comprising a target sensing inductive element and a reference inductive element directly coupled together at a node, and a capacitive element having a first side directly connected to the node and a second side directly connected to the connection point,
wherein the source circuit is configured to energize the resonant circuit via the capacitive element, and
wherein the target sensing inductive element is oriented in a substantially orthogonal direction relative to the reference inductive element.

2. The inductive proximity sensor of claim 1, wherein the inductive source element is configured to energize the resonant circuit in response to the switch transitioning to the second state.

3. The inductive proximity sensor of claim 1, wherein the switch is a semiconductor switch.

4. The inductive proximity sensor of claim 1, wherein the current source is a constant current source or a step current source.

5. The inductive proximity sensor of claim 1, further comprising:
a differential input voltage amplification circuit coupled to the source circuit and coupled to the resonant circuit; and
an analog multiplier coupled to the resonant circuit, the analog multiplier arranged to receive signals associated with the reference inductive element and the target sensing inductive element, the analog multiplier configured to output a signal related in amplitude to a difference between a first current in the reference inductive element and a second current in the target sensing inductive element.

6. The inductive proximity sensor of claim 1, wherein the resonant circuit comprises a switch connected between the connection point and the node.

7. The inductive proximity sensor of claim 1, wherein the reference inductive element is shielded from a target metal in proximity of the inductive proximity sensor using Mu-metal shielding.

8. The inductive proximity sensor of claim 5, further comprising the differential input voltage amplification circuit configured to send, to the analog multiplier, a voltage signal corresponding to a resonant signal generated by the resonant circuit.

9. A proximity detector, comprising:
an inductive proximity sensor comprising a circuit loop containing only a current source, an inductive circuit element, and a control element configured to initiate a change in a current flowing in the inductive circuit element, the control element located in the circuit loop, and wherein the inductive circuit is coupled to the control element at a connection point; and
the inductive proximity sensor further comprising a resonant circuit coupled to the inductive circuit element, the resonant circuit comprising a target sensing inductive element and a reference inductive element both directly connected to a first side of a capacitive element
wherein a second side of the capacitive element is directly connected to the connection point, wherein the reference inductive element is oriented substantially orthogonally relative to the target sensing inductive element and wherein the current flowing in the inductive circuit element and a voltage across the resonant circuit are initially unchanged upon activating the control element.

10. The proximity detector of claim 9, further comprising a shunt resistive element connected between the first side of the capacitive element and the connection point via a switching element, the shunt resistive element and switching element configured to quench oscillations in the resonant circuit.

11. The proximity detector of claim 9, wherein the control element comprises a switching device.

12. The proximity detector of claim 9, wherein the current source is a constant current source or a step current source.

13. The proximity detector of claim 10, further comprising a timing module configured to close the switching element in response to an elapse of a defined time duration after the control element has transitioned to an open state, and to open the switching element prior to transitioning the control element to a closed state.

14. A process control system, comprising: an inductive proximity sensor comprising a source current circuit containing only a current source, an inductive circuit element and a control component, the control component configured to initiate a change in a current flowing in the inductive circuit element, wherein the control component is coupled in the source current circuit, and wherein the inductive circuit element is coupled to the control component at a connection point; the inductive proximity sensor further comprising a resonant circuit coupled to the inductive circuit element, the resonant circuit connected to the control component, the resonant circuit comprising a target sensing inductive element and a reference inductive element directly connected together at a node and oriented substantially orthogonally relative to one another, and a capacitive element having a first side directly connected to the node and a second side directly connected to the connection point, wherein the current flowing in the inductive circuit element and a voltage across the resonant circuit are initially unchanged upon activating the control component; and a processor coupled to at least one of the source current circuit or the inductive proximity sensor, wherein the processor is configured to process signals associated with eddy currents generated in a metal based on an output of the inductive proximity sensor.

15. The process control system of claim 14, wherein a rate of decay of the current flowing in the inductive circuit element is based on the eddy currents.

16. The process control system of claim 14, wherein the control component comprises at least one of a switching element the current source is a constant current source or a step current source.

17. The process control system of claim 14, wherein the current flowing in the inductive circuit element is characterized by the voltage across the resonant circuit independent of a resonant state of the resonant circuit.

18. The process control system of claim 14, wherein the current flowing in the inductive circuit element and the voltage across the resonant circuit are initially independent of a present state of the resonant circuit when the control component is activated.

19. The process control system of claim 14, further comprising a switching element in series with a shunt resistor configured to de-energize the resonant circuit in response to the switching element being closed, a timing module configured to close the switching element in response to an elapse of a defined time duration after the control component has transitioned to an open state, and to open the switching element prior to transitioning the control component to a closed state.

* * * * *